United States Patent [19]

Stith, Jr.

[11] 4,073,308

[45] Feb. 14, 1978

[54] VALVE

[76] Inventor: Morris Randall Stith, Jr., R.R. #1, Box 13, Webster, Ky. 40176

[21] Appl. No.: 734,251

[22] Filed: Oct. 20, 1976

[51] Int. Cl.² ............................................. F16L 53/00
[52] U.S. Cl. ............................... 137/340; 137/614.11; 251/175; 251/191; 251/297
[58] Field of Search ........................ 137/340, 614.11; 251/175, 191, 268, 269, 297

[56] References Cited

U.S. PATENT DOCUMENTS

| | | | |
|---|---|---|---|
| 763,208 | 6/1904 | Robinson | 251/175 |
| 2,114,789 | 4/1938 | Urquhart | 251/28 |
| 2,720,219 | 10/1955 | Grove et al. | 137/630.19 |
| 2,839,265 | 6/1958 | Hobbs | 251/85 |
| 3,211,419 | 10/1965 | Lohr | 251/186 |

Primary Examiner—Edgar W. Geoghegan
Attorney, Agent, or Firm—Koenig, Senniger, Powers and Leavitt

[57] ABSTRACT

A valve comprising a valve body having a bore and a plunger axially movable in the bore between an open and a closed position. The bore has a fixed valve seat therein and is in communication with an inlet port and outlet port on opposite sides of the bore seat. The plunger has a seat cooperable with the bore seat to make a leak-tight, face-to-face seal when the plunger is in its closed position. The plunger also carries a pressure-actuated "seatless" seal which seals against the walls of the bore and the plunger when the plunger is in its closed position and is subjected to system pressure.

25 Claims, 6 Drawing Figures

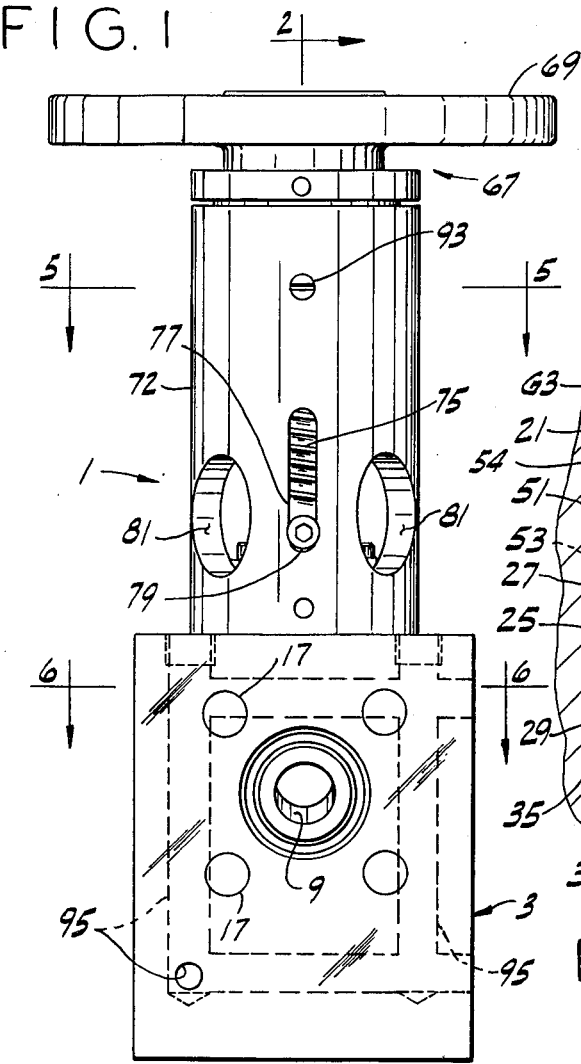
FIG. 1
FIG. 5
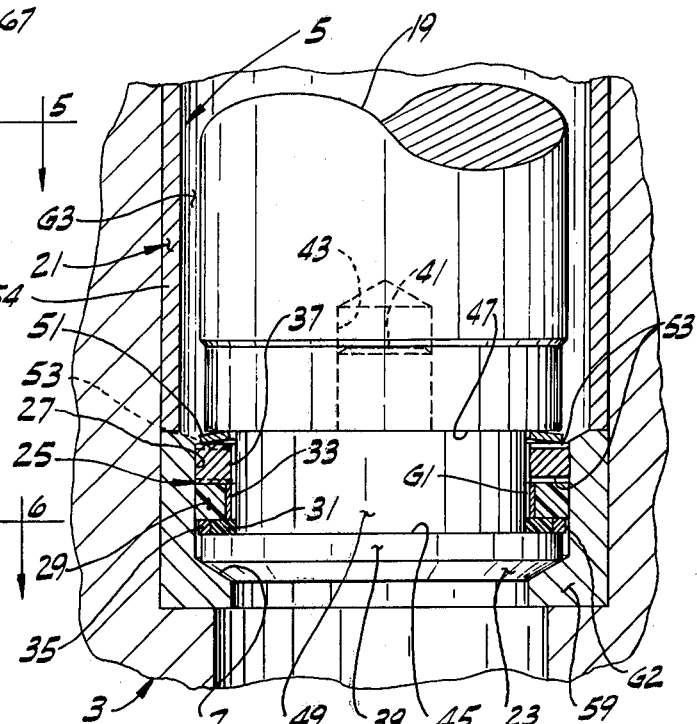
FIG. 4
FIG. 6
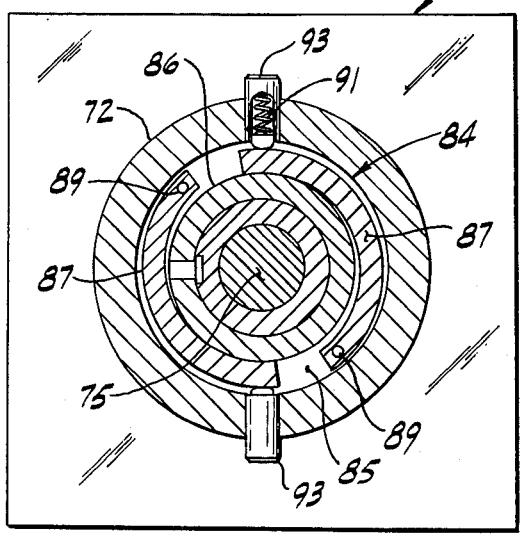

VALVE

BACKGROUND OF THE INVENTION

This invention relates to a valve, and more particularly to a valve for service in a high-pressure, high-temperature fluid system, such as in urea synthesis or similar processes.

Heretofore, valves used in high-temperature, high-pressure processes were typically short-lived, often did not properly seal, and were expensive. Generally, these prior art valves were high-pressure split globe valves with a stationary seat in the valve body and a valve member movable between an open position and a closed position by turning a handwheel and threaded screw arrangement. These prior art valves required as many as about 40 turns to fully open or close the valve and the valve operator had to exert relatively high turning torque on the handwheel to open and close the valve. When closed, sealing was accomplished by a metal face-to-metal face seal between the valve member and a stationary seat.

In order to make a leak-tight face-to-face seal it is critical that the movable valve member be maintained in precise alignment with the stationary seat and that both of the seats be clear of any obstruction, such as dirt, corrosion, or solidified system fluid which would prevent the valve member from properly seating on the stationary seat. It has been found that small leaks in a face-to-face seal will, in a relatively short time, cause deterioration of the valve and valve member when the valve is subjected to high-system fluid pressure. More particularly, a fluid under high pressure will flow through a small leak in a face-to-face seal at very high velocity and this fast-moving fluid will rapidly erode the valve member and the valve seat. This type of erosion is commonly referred to as wire drawing. Of course, as the valve seat or valve member is worn away, the leak rate of the valve will increase.

In certain manufacturing processes, such as in the manufacture of urea, additional problems are encountered by the system valves. For example, the system fluid in a conventional urea process must not only by maintained under high pressure, but its temperature must be maintained above the freezing point of urea (approximately 130° F. or more) so as to prevent it from freezing in the system. For example, the system fluid in a urea synthesis process is typically maintained at 2500 psi and at a temperature of about 400° F. To prevent undue cooling of the system fluid as it flows through the valve, valves are often heated as, for example, by wrapping the valve with steam lines and circulating steam therethrough. In practice, however, these added-on steam lines have not always adequately heated the valve and the steam lines themselves have caused many maintenance problems. In the event, the system fluid would freeze in known prior art valves the solidified fluid would prevent the valve from moving from its closed to its open position. This, of course, could cause a serious risk to the safety of the process. In the event a prior art valve would freeze closed, it was necessary to thaw the valve by heating it. Oftentimes, an operator would, in attempting to open the valve, apply excessive turning torque to the valve handwheel and thus damage the valve. The system would then have to be shut down and the valve repaired or replaced.

Valves are known which make both a face-to-face seal between a pair of metal seats and a so-called seatless seal with the latter being mechanically compressed in axial direction so as to cause its deformable seal member to expand radially into sealing engagement with the bore of the valve housing and the valve member. In some known valves, this deformable seal is compressed by a lost motion arrangement after the valve seats have seated. In order to fully compress this seatless seal, it is necessary for the operator to continue turning the valve handwheel after the valve has apparently "bottomed out" (i.e., after the metal seats have mated). It has been found that operators often failed to continue turning the handwheel after it "bottomed out" and thus the seatless seal was often inadequately compressed. Reference may be made to such U.S. patents as U.S. Pat. Nos. 2,720,219, 2,839,265 and 3,211,419 which disclose valves similar to the above-mentioned valves having a lost-motion connection for mechanically compressing the "seatless" seal. In other known valves, the "seatless" seal is axially compressed by the fluid pressure within the valve. These prior pressure-actuated seatless seals were not, however, well suited to high temperature, high pressure service. Reference may also be made to such U.S. patents as U.S. Pat. Nos. 763,208 and 2,114,789 which disclose valves having pressure-actuated seals.

SUMMARY OF THE INVENTION

Among the several objects and features of the present invention may be noted the provision of a valve, particularly adapted for service in high-pressure, high-temperature systems, which reliably closes to form a leak-tight seal which will withstand the effects of fire or explosions in the system; the provision of such a valve in which "wire draw" erosion of its valve seat is inhibited; the provision of such a valve which is easy to manually open and close and which opens and closes at a rate substantially faster than known manually-operated block valves of comparable size and under comparable operating conditions; the provision of such a valve which utilizes a deformable seal which does not cold flow when subjected to high-system fluid pressure or to high-speed fluid flow; the provision of a valve which is not prevented from moving from its closed to its open position in the event system fluid within the valve freezes; the provision of such a valve which may be readily maintained at a desired elevated temperature by steam or other heated fluid; the provision of such a valve in which parts worn by the flow of fluid therethrough may be readily replaced; the provision of such a valve which has a relatively long service life, which is safe in operation, and which is of simple and rugged construction.

Briefly, a valve of this invention comprises a valve body, the latter having a bore therein, an inwardly projecting seat in the bore, an inlet port in communication with the bore on one side of the bore seat, and an outlet port in communication with the bore on the other side of the bore seat; the inlet port, the outlet port and a portion of the bore interconnecting the inlet port and the outlet port constituting a flow passage. The valve further comprises a valve plunger axially movable within the bore, this plunger having a rigid seat thereon and being movable between an open position in which the plunger is substantially clear of the flow passage so that fluid may flow therethrough substantially without restriction by the plunger and a closed position in which the plunger seat is in substantially leak-tight face-to-face engagement with the bore seat. The plunger carries pressure actuated seal means for sealing engagement with the walls of the bore when the plunger is in its closed position. The pressure actuated seal means comprises a first deformable seal ring sealingly engageable with the walls of the bore, a second deformable seal ring sealingly engageable with the plunger, means for containing the seal rings and for permitting radial expansion of the first seal ring into sealing engagement with the walls of the bore and of the second sealing ring into sealing engagement with the plunger when the seal rings are subjected to axial compression loading. The pressure-actuated seal also includes means responsive to fluid pressure for applying axial compression loading to the seal rings for effecting generally radial expansion of the seal rings into respective sealing engagement with the bore and plunger. Other objects and features will be in part apparent and in part pointed out hereinafter.

BRIEF DESCRIPTION OF THE DRAWINGS

FIG. 1 is a side elevational view of a valve of this invention showing the inlet side of the valve;

FIG. 4 is an enlarged view of a portion of the valve plunger in its closed position illustrating details of a pressure-actuated seal and a metal face-to-metal face seat seal;

FIG. 5 is a horizontal cross-sectional view taken along line 5—5 of FIG. 1 illustrating means for preventing system pressure within the valve from self-opening the valve; and FIG. 6 is a horizontal cross-sectional view taken along line 6—6 of FIG. 1 illustrating a series of passages in the body of the valve through which steam or other heated fluid may be circulated for heating the valve.

Corresponding reference characters indicate corresponding parts throughout the several views of the drawing.

DESCRIPTION OF A PREFERRED EMBODIMENT

Figure 2:
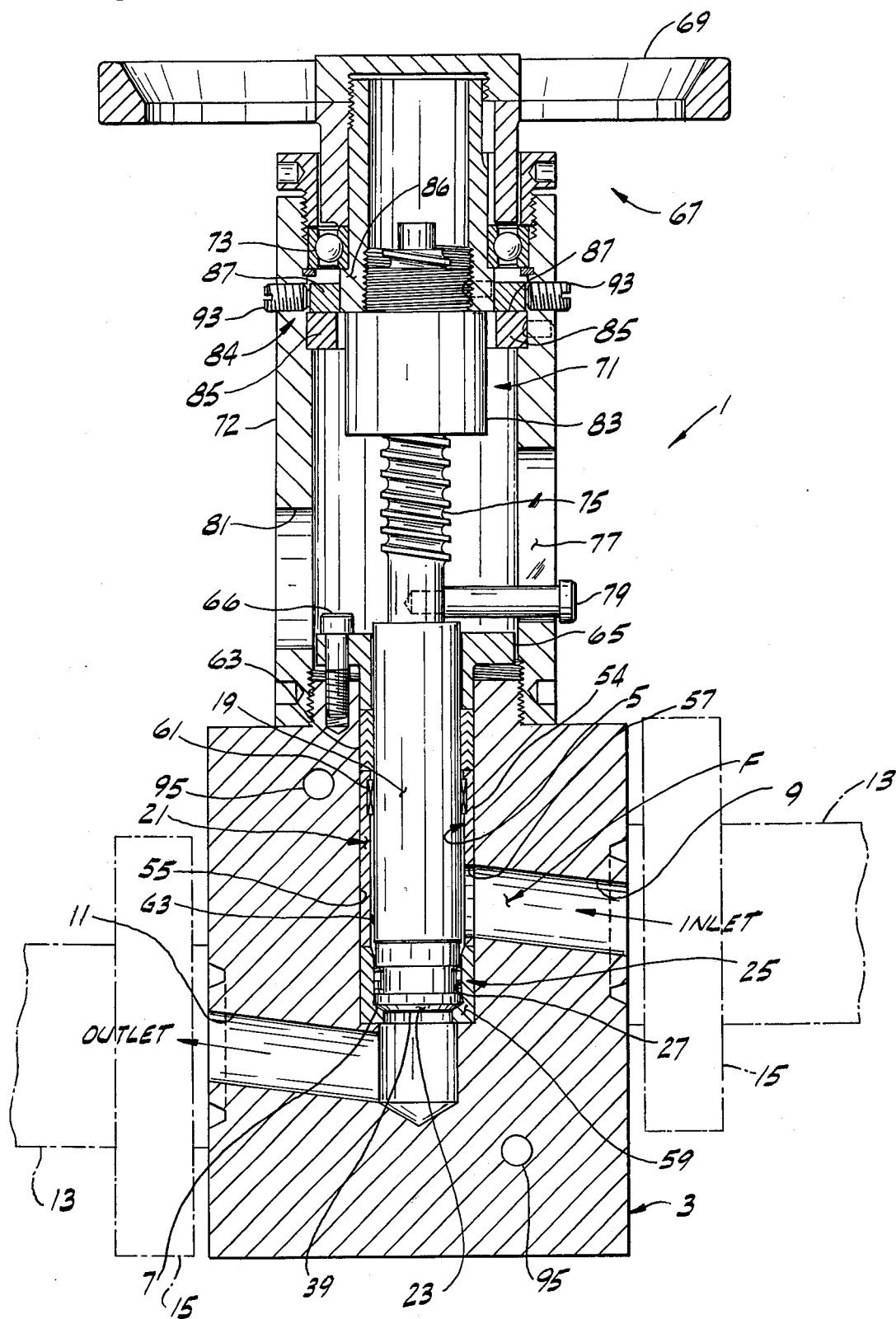
FIG. 2 is a vertical cross section taken along line 2—2 of FIG. 1 showing the valve plunger in its closed position and showing the system piping (illustrated in phantom) secured to the inlet and outlet sides of the valve.

Referring now to the drawings, a valve of the present invention, indicated in its entirety at 1, is shown to have a valve body 3. Preferably, the valve body is fabricated from a solid block of suitable metal, such as A151-316L stainless steel or the like, and has a bore 5 therein. An inwardly projecting bore seat 7 is provided in the bore. The valve body also has an inlet port 9 in communication with the bore on one side of bore seat 7 and an outlet port 11 on the other side of the bore seat in communication with the bore. Both the inlet and outlet ports are adapted to be readily secured (i.e., bolted) to the system piping. As is conventional, the system piping 13 (shown in phantom in FIG. 2) is provided with piping flanges 15, the latter being adapted to be bolted to valve body 3 by bolts (not shown) threadably received in bolt holes 17 (See FIG. 1). A portion of bore 5 between the inlet and outlet ports together with the inlet and outlet ports constitute a flow passage F through the valve body.

Figure 3:
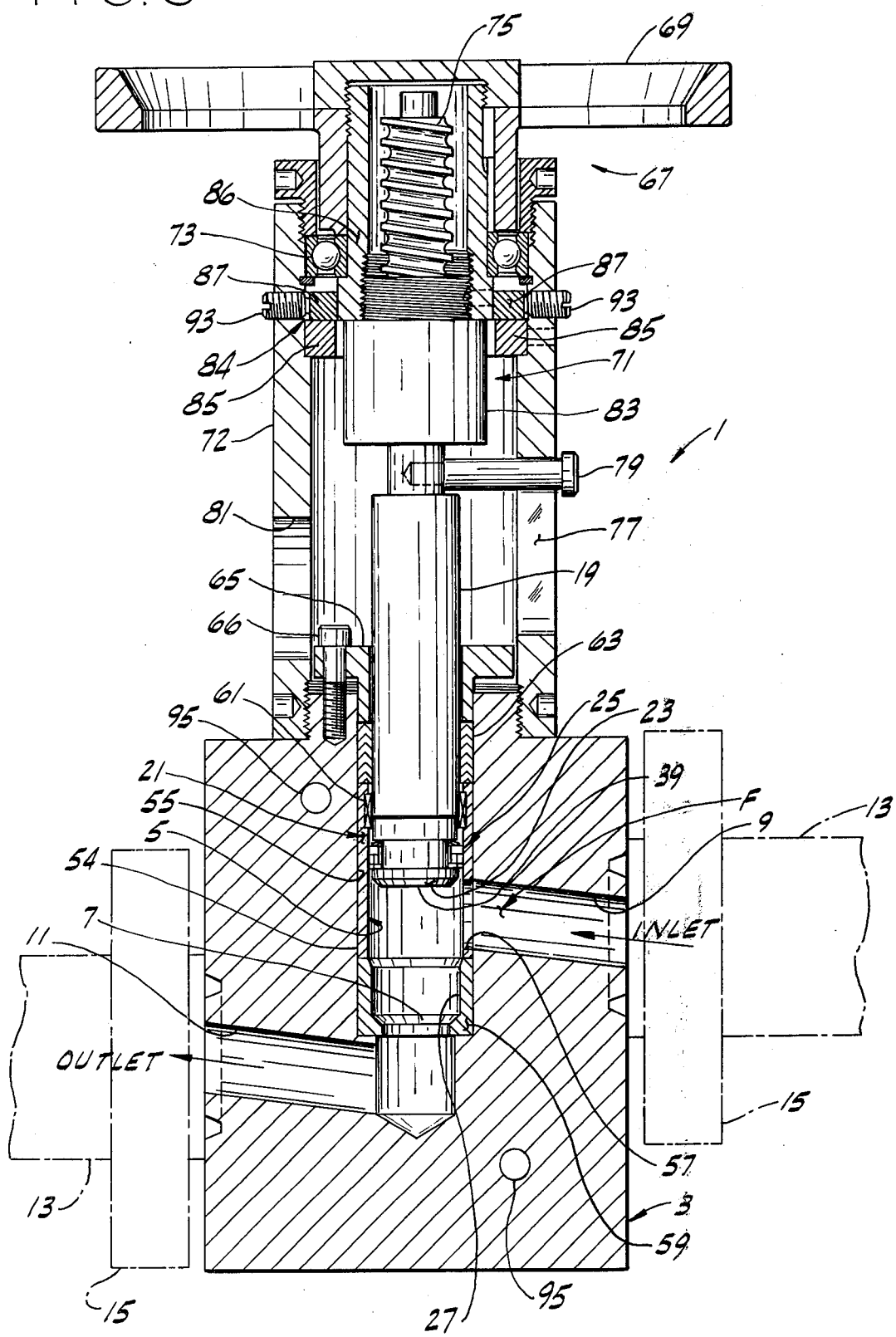
FIG. 3 is a view similar to FIG. 2 showing the valve plunger in its fully open or retracted position.

Valve 1 further comprises a plunger 19 axially movable within bore 5. More specifically, the plunger is axially movable within a removable liner 21 inserted into a hole in the valve housing with the inside of the liner constituting bore 5. Plunger 19 is shown to be a cylindric member of relatively constant diameter along its length and has a rigid seat 23 on its free end. The plunger is axially movable within the bore between an open position (as shown in FIG. 3) in which the plunger is substantially clear of flow passage F so that fluid may flow therethrough substantially without restriction by the plunger and a closed position (as shown in FIGS. 2 and 4) in which plunger seat 23 is in a substantially leak-tight, face-to-face sealing engagement with bore seat 7.

In accordance with this invention, plunger 19 carries a pressure-actuated "seatless" seal, as is generally indicated at 25, for sealing engagement with bore 5 (i.e., the walls of liner 21) and the plunger when the plunger is in its closed position. More specifically, the pressure actuated seal is sealingly engageable with a portion of liner 21 between bore seat 7 and inlet port 9, this bore sealing portion being indicated at 27 (see FIGS. 2–4). As best seen in FIG. 4, this pressure-actuated seal comprises a first deformable seal ring 29 which is sealingly engageable with bore sealing portion 27 and a second deformable seal ring 31 which is sealingly engageable with plunger 19. While deformable seal rings may be of any suitable material, they are preferably of a glass fiber filled (25%) tetrafluoroethylene (TFE) synthetic resin, commercially available from E. I. duPont de Nemours and Company, Wilmington, Delaware, under the registered trademark TEFLON. When subjected to stress, most synthetic resin materials, including TFE, exhibit a tendency to cold flow or creep. The amount of cold flow will vary with the temperature and stress to which the material is subjected. The pressure-actuated seal further comprises a pair of first and second metal rings 33 and 35, respectively, cooperable with seal rings 29 and 31 for containing the deformable seal rings and for substantially preventing them from cold-flowing when subjected to high-system fluid pressure and temperatures or to high velocity fluid impinging thereagainst. These metal rings permit radial outward expansion of the first seal ring 29 into sealing engagement with sealing portion 27 of liner 21 and radial inward expansion of the second seal 31 into sealing engagement with the plunger when the seal rings are subjected to axial compression loading. The pressure actuated seal also includes a pressure distributing ring 37 responsive to fluid pressure for applying axial compression loading to the seal rings for effecting radial expansion of the seal rings into sealing engagement with the bore sealing portion of the plunger.

As shown in FIG. 4, plunger 19 has an end-cap 39 threaded thereon. This end-cap may be made of any suitable material compatible with the system fluid and with the system environment. Currently, hardened A151 316L stainless steel is the preferred material but other materials are being considered. The end-cap has a bevel therearound which constitutes plunger seat 23 which matches the slope of the bevel on bore seat 7. The cap further has a threaded stud 41 extending endwise therefrom for being threadably received in a hole 43 in the end of plunger 19. The main body of the cap is generally cylindric and is of a smaller diameter than the main body of plunger 19 and the head of the cap having bevel 23 thereon is generally of the same diameter as the main portion of the plunger so that with the cap threaded on the end of the plunger, the body of the cap forms a generally channel-shaped groove around the plunger with the inner face of the cap constituting a first side face 45 of the groove, with the outer end of the plunger constituting a second side face 47, and with the main body portion of the cap constituting an inner or base face 49 of the groove, this last-mentioned groove face being generally parallel to the axis of plunger 19 and being generally perpendicular to groove side faces 49 and 47. With pressure-actuated seal 25 installed on the plunger, its various components are arranged in the plunger groove with the second seal ring 31 adjacent the first groove side face 45, and with the first sealing ring 29 disposed between the second sealing ring and pressure distributing ring 37. The pressure actuated seal further comprises a Belleville spring washer 51 disposed between the second side face 47 of the groove and pressure distributing ring 37 to bias the pressure distributing ring and the seal rings into an engagement with one another and to bias the second sealing ring into engagement with the first side face 45 of the groove.

As best shown in FIG. 4 pressure distributing ring 37 has a series of radial grooves 53 therein to evenly or uniformly distribute fluid pressure across the pressure distributing ring so as to effect uniform axial compression of seal rings 29 and 31. This insures that the seal rings are properly axially compressed and are thus properly radially expanded into sealing contact with the wall of bore sealing portion 27 and with the base face 49 of plunger 19.

First seal ring 29 has an outer diameter approximately equal to the diameter of bore sealing portion 27 and an inner diameter greater than the diameter of base face 49 of the plunger groove. Thus, a first gap G1 is provided between the inner edge of the first seal ring and the base face 49 of the groove. The first metal ring 33 is interposed in gap G1 and it backs up the inner edge of the first sealing ring so that upon application of axial compression force to the first sealing ring with resultant radial outward expansion of the first seal ring, its outer edge sealingly engages the wall of bore sealing portion 27. The second seal ring 31 has an inner diameter approximately equal to the diameter of base face 49 of the plunger groove and it has an outer diameter less than the diameter of bore sealing portion 27. A second gap G2 is provided between the outer edge of the second seal ring 31 and the wall of the bore sealing portion. The first and second seal rings at least partially overlap with one another and sealingly engage one another along their mutually overlapped portions when subjected to axial compression loading. Also, second seal ring 31 sealingly engages first face 45 of the plunger groove while under axial compression loading. The second metal ring 35 is disposed in gap G2 on the outer edge of the second sealing ring. It will thus be seen that the first metal ring confines the first sealing ring against inward radial expansion and it together with the pressure distributing ring and the second metal ring 35 otherwise confine the first seal ring. The second metal ring substantially prevents outward radial expansion of the second sealing ring. The latter is shown to be confined by the first face 45 of the plunger groove, by the second metal ring 35, by the first sealing ring, and by the first metal ring. In this manner both of seal rings 29 and 31 are confined against cold flow into the first and second gaps G1 and G2 when subjected either to high fluid systems pressures or to high velocity fluid flow impinging thereon. It will be particularly noted that Belleville spring 51 maintains the seal rings and other components of pressure actuated seal 25 in abutting relation, so that upon being subjected to high velocity fluid flow as occassioned by moving the plunger between its open and closed positions, the various components are not separated from one another and are in proper relation for sealingly engaging one another, the walls of sealing portion 27 and the side and inner faces 45, 47 and 49, respectively, of the plunger groove.

As previously mentioned, first and second seal rings 29 and 31 are preferably of a glass filled tetrafluoroethylene synthetic resin. The first metal ring 37 may be of a suitable alloy, such as is commercially available from the International Nickel Company under their trade designation INCONEL X-750, which is either compatible with the valve requirements or is specially treated (e.g., chromized) to be compatible. The second metal ring 35 is preferably of a titanium-base alloy, such as 6AL4V.

While valve 1 of this invention is particularly well suited for service in any high pressure, high temperature fluid system, it is particularly adapted for service in a urea synthesis process in which the system fluid (e.g. carbamate) is maintained at an elevated temperature (e.g. 400° F or 204° C) to prevent freezing of the fluid and is under high pressure (e.g., 2500 psi).

In FIGS. 2 and 3, liner 21 is shown to comprise a removable upper portion 54, preferably of A151 316L stainless steel or other suitable material, and is adapted to slideably fit in a hole 55 provided in valve housing 3. The inner diameter of upper portion 54 of the liner is somewhat greater than the outer diameter of plunger 19 so that a gap G3 (see FIG. 4) is present between the plunger and the inner wall of the liner. The liner has an opening 57 therein registered with inlet port 9 thereby to permit fluid flow through fluid passage F substantially without restriction from the liner. As shown in FIG. 3 the lower end of plunger 19 (i.e. cap 39) is above opening 57 when the plunger is fully retracted in its open position so that the plunger does not substantially interfere with fluid flow through the valve. Gap G3 is of sufficient size as to permit the system fluid to freely flow around the entire circumference of the plunger when the latter is in closed position and to thus uniformly act on the pressure actuated "seatless" seal 25.

Liner 21 further comprises a seat portion 59 having bore seat 7 formed therein. Seat portion 59 is preferably of a material which is substantially harder than the material (e.g., 316L stainless steel) from which valve body 3 is made. For example, seat portion 59 may be of a cobalt-based alloy, such as STELLITE 6 commercially available from Stellite Division of the Cabot Corporation, of Kokomo, Indiana. Seat portion 59 has the previously mentioned bore sealing portion 27 therein and the inner diameter of the latter is somewhat less than the inner diameter of the upper portion 53 of the liner. Preferably, seat portion 59 is shrink fitted into hole 55 of the valve body thereby to be securely held therein.

The upper portion 54 of liner 21 has a circumferential bearing 61 adjacent its upper end for slidably engaging plunger 19 and for keeping the latter substantially in axial alignment with the longitudinal center line of bore 5 as the plunger is moved between the open and closed positions. The liner is sealed with respect to valve body 3 by means of packing seals 63 held in place and sealingly compressed by a gland ring 65 held in place on valve body 3 by bolts 66. Preferably, gland packing seals 63 are made of a glass filled tetraflouroethylene (TFE) synthetic resin material or the like.

Further in accordance with this invention, plunger 19 is moved axially within bore 5 between its open and closed position by means, as is generally indicated at 67, including a manually rotatable handwheel 69 and a ball bearing screw drive 71. The handwheel is supported by a tubular extension 72 removably secured to valve body 3 and surrounding gland ring 65. Handwheel 69 is journalled on extension 72 by means of a ball bearing 73 for facilitating turning of the handwheel. As indicated in 75, a ball bearing screw is fixedly secured to plunger 19 and extends axially therefrom. An elongate vertical slot 77 is provided in extension 72 and a headed pin 79 is inserted through the slot and is threaded into the ball bearing screw. This pin moves vertically in the slot as the plunger is moved between its open and closed position and the close fitting walls of the slot hold the pin and the plunger against rotation as the plunger is moved between its open and closed position. Other holes 81 are provided in extension 72 to provide access to gland ring 65 and gland bolts 66 and to vent system pressure in the event of failure of the gland seal 63.

Ball bearing screw drive 71 further comprises a ball bearing nut 83 secured to and rotatable with handwheel 69. This nut threadably engages ball bearing screw 75 so as to effect opening and closing of the valve. For example, in a three-inch size block valve of this invention, ball bearing screw 75 and ball bearing nut 83 may be units commercially available from Saginaw Steering Gear Division of General Motors Corporation, Saginaw, Michigan, having 4 threads per inch. Thus, plunger 19 of this valve may, for example, be moved between its full open and full closed position by about 20 turns of the handwheel 69. The closing torque required to move the handwheel from its full open to its full closed position is about 55 foot pounds when subjected to fluid pressure of 2500 psi.

It will be understood that the system pressure exerts a force on the end of the plunger which tends to push it out of bore 5 toward its open position. In order to prevent the system pressure acting on the plunger from self-opening the valve by back driving the plunger, a brake, as generally indicated at 84, is provided. This brake is carried by a ring 85 and is engageable with a collar 86 secured to ball bearing nut 83 (see FIG. 5) and rotatable therewith so that upon rotation of ball bearing nut 83 in one direction for moving plunger 19 from its closed to its open position the brake applies sufficient drag via its frictionally engaging collar 86 to prevent the valve from self-opening when subjected to fluid pressure. More particularly, brake 84 (as shown in FIG. 5) comprises a pair of brake shoes 87 on opposite sides of a collar 86 secured to ring 85 which in turn is secured to extension 72. These brake shoes are shown to be part circular members hinged at one end, as indicated at 89, to ring 85 with their other ends slidably engageable with collar 86. The hinged ends of brake shoes 87 lead their free ends when the hand wheel, along with the collar and ball bearing nut, is turned to move plunger 19 inwardly to its closed position and thus apply little or no braking force on the collar. However, upon the plunger moving from its closed to its open position, the brake members will self-lock on the collar. Springs 91 within adjustement screws 93 bias the free ends of the brake shoes in toward collar 86 and the force exerted by these springs on the brake shoes may be varied by adjustment screws 93. Upon system fluid pressure within the valve exerting a force on plunger 19 tending to force it out of bore 5 a turning force is exerted on ball bearing nut 83 and collar 86 secured thereto. Brake shoes 87, however, self-lock (i.e., frictionally engage) on collar 86 thereby to prevent the valve from self-opening. It will be understood that brake 84 is operable only to prevent self-opening of the valve and it applies little or no drag when the operator is closing the valve. Of course, by manually turning handwheel 69, the self-locking force of the brake can readily be overcome to open the valve.

In accordance with this invention, it will be particularly noted that the above-described arrangement of plunger 19 in liner 21 is such that no cavities or chambers are provided in the valve in which system fluid (e.g., urea) is permitted when the valve is in its closed position. In urea or in other service in which the system fluid may undesirably solidify (freeze) in the valve, the elimination of these cavities prevents solidified fluid from forming an incompressible block which physically prevents the plunger from moving from its closed to its open position. While the fluids may solidify in gap G3 between the inner face of liner 21 and plunger 19, an operator may readily supply sufficient torque to handwheel 69 to force the valve plunger via ball bearing screw drive 71 open as by shearing the solidified fluid in gap G3.

Further in accordance with this invention, a plurality of holes 95 are provided in valve body 3 to substantially surround bore 5 as shown in FIG. 6. These holes intersect one another in such manner that steam or another heated fluid may be circulated therethrough. Thus, valve body 3 may be maintained at an elevated temperature to prevent the freezing of the system fluid as the latter flows through the valve. Because the steam jacketing holes 95 are integral within valve body 3, the steam circulated therethrough is in good thermal contact with the valve body and there is virtually no possibility of these steam passages developing leaks. Thus, the above-described steam jacketing arrangement for the block valve of this invention overcomes many of the problems associated with add-on steam lines heretofore used to steam jacket prior block valves.

It will be appreciated that by providing a removable liner 21, and a removable plunger 19 that all parts of the valve 1 of this invention subject to fluid flow erosion or corrosion may readily be replaced thereby significantly extending the service life of the valve.

It will be further noted that as plunger 19 is moved toward its closed position (as shown in FIG. 2) that pressure-actuated seal 25 will be axially compressed by the fluid pressure to effectively seal the flow path prior to mating of plunger seat 23 and bore seat 7. The making of this seal, however, is not readily detectable by the valve operator. The operator will continue to turn handwheel 69 until the plunger seal bottoms out on the bore seat thereby making a metal face-to-metal face seal between plunger seat 23 and bore seat 7. It will thus be appreciated that the "seatless" seal 25 effectively seals flow path F so that in the event seats 23 and 7 do not properly seat, neither seat will be subjected to "wire draw" erosion caused by high velocity fluid flowing between the seats. In the event there is a fire or explosion in the fluid system generating extreme heat and pressure which would cause failure of seal rings 29 and 31, the metal face-to-metal face seal between seats 7 and 23 effectively seals the flow passage preventing the spread of the fire or explosion.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A valve comprising a valve body, the latter having a bore therein, an inwardly projecting seat in said bore, an inlet port in communication with said bore on one side of said bore seat, and an outlet port in communication with said bore on the other side of said bore seat, said inlet port, said outlet port, and a portion of said bore interconnecting said inlet and outlet ports constituting a flow passage, said valve further comprising a valve plunger axially movable within said bore, said plunger having a rigid seat thereon and being movable between an open position in which said plunger is substantially clear of said flow passage so that fluid may flow therethrough substantially without restriction by said plunger and a closed position in which said plunger seat is in substantially leak-tight face-to-face engagement with said bore seat, said plunger carrying pressure-actuated seal means for sealing engagement with the walls of said bore when said plunger is in its closed position, said pressure-actuated seal means comprising a first deformable seal ring sealingly engageable with the walls of said bore, a second deformable seal ring sealingly engageable with said plunger, means for containing said seal rings and for permitting radial expansion of said first sealing ring into sealing engagement with the walls of said bore and of said second sealing ring into sealing engagement with said plunger when said seal rings are subjected to axial compression loading, and means responsive to fluid pressure for applying axial compression loading to said seal rings for axially compressing them and for effecting generally radial expansion of said seal rings into respective sealing engagement with said bore and said plunger.

2. A valve as set forth in claim 1 wherein said plunger has a circumferential groove therein adjacent its seat for receiving said pressure-actuated seal means, said groove being channel-shaped in crosssection and having a first side face adjacent said plunger seat, a second side face on the opposite side of the groove from said first side face, and a base face, said pressure-actuated seal means further comprising a pressure distributing ring disposed between said second side face and said seal rings whereby fluid pressure acts against said pressure distributing ring and the latter applies a substantially uniform axial compression load to said seal rings.

3. A valve as set forth in claim 2 further comprising spring means interposed between said pressure distributing ring and said second side face of said groove for biasing said pressure distributing ring and said seal rings into engagement with one another and into engagement with said first said face of said groove.

4. A valve as set forth in claim 3 wherein said spring means is a Belleville washer.

5. A valve as set forth in claim 2 wherein said pressure distributing ring has a plurality of pressure distributing channels in at least one face thereof for facilitating distribution of fluid pressure on said pressure distributing ring thereby to substantially uniformly apply fluid pressure to said seal rings.

6. A valve as set forth in claim 2 wherein said bore has a sealing portion of relatively constant diameter between said bore seat and said inlet port, wherein said first seal ring sealingly engages said bore sealing portion, and wherein said first seal ring has an outer diameter approximately equal to the diameter of said bore sealing portion and an inner diameter greater than the diameter of said base face of said groove with a first gap between the inner face of said ring and said base face of said groove, the outer face of said first seal ring being sealingly engageable with said bore sealing portion upon fluid pressure being applied to said pressure-actuated seal means.

7. A valve as set forth in claim 6 wherein said second seal ring has an inner diameter approximately equal to the diameter of said base face of said groove and an outer diameter less than the diameter of said bore sealing portion with a second gap between the outer face of said second seal ring and said bore sealing portion, the inner face of said second seal ring being sealingly engageable with said base face of said groove upon the application of fluid pressure to said pressure-actuated seal means.

8. A valve as set forth in claim 7 wherein said means for containing said seal rings comprises a first metal ring disposed within said first gap and a second metal ring disposed within said second gap, said first metal ring substantially confining said first seal ring against inward expansion toward said base face of said groove, and said second metal ring substantially prevents outward radial expansion of said second seal ring toward said bore sealing portion.

9. A valve as set forth in claim 8 wherein the second seal ring when subjected to axial compression loading sealingly engages said first side face of said plunger groove.

10. A valve as set forth in claim 8 wherein the entire face of said second seal ring toward said first side face of said plunger groove is in contact with said first seal face whereby the latter and said second metal ring prevent cold flow of said second seal ring.

11. A valve as set forth in claim 8 wherein the inner portion face of said first seal ring toward said plunger seat is engageable with said second metal ring thereby to substantially prevent cold flow of said first seal ring toward said plunger seat upon high velocity fluid impinging thereagainst as said plunger is moved between its opened and closed positions.

12. A valve as set forth in claim 8 wherein said first and second seal rings are of glass filled tetrafluoroethylene.

13. A valve as set forth in claim 12 wherein said second metal ring is of a titaniumbased alloy.

14. A valve as set forth in claim 1 for service in a fluid pressure system wherein the system fluid is a heated liquid having a freezing point above room temperature and which upon freezing forms a substantially incompressible solid, said plunger being a cylindric member having a substantially constant diameter only slightly smaller than the diameter of said bore thereby to eliminate all pockets or cavities in which said system fluid may accumulate and upon freezing form a solid incompressible block which prevents said plunger from moving from its closed to its open position.

15. A valve as set forth in claim 14 wherein said bore is constituted by a hollow liner removably insertable into said valve body, said liner receiving said plunger.

16. A valve as set forth in claim 15 further comprising means carried by said liner and engageable with said plunger for maintaining the latter substantially in axial alignment with said bore as said plunger is moved between its opened and closed positions.

17. A valve as set forth in claim 16 further comprising packing seal means for sealingly engaging said plunger as the latter is moved between its opened and closed positions.

18. A valve as set forth in claim 15 wherein said bore seat is carried by said liner and the latter is of a material which is substantially harder than said valve body.

19. A valve as set forth in claim 1 further comprising means for moving said plunger between its opened and closed positions and for holding said plunger against rotation about its longitudinal axis as it is moved between its opened and closed positions.

20. A valve as set forth in claim 19 wherein said moving means comprises a rotatable member and ball-bearing screw drive means driven by said rotatable member for axially moving said plunger between its opened and closed positions.

21. A valve as set forth in claim 20 wherein said ball-bearing screw drive means comprises a ball-bearing screw co-axial with said plunger fixedly secured thereto and extending endwise therefrom, and a ball-bearing nut threadably engageable with said ball-bearing screw, said rotatable member rotatably driving said ball-bearing nut relative to said ball-bearing screw for effecting axial movement of said plunger between its opened and closed positions.

22. A valve as set forth in claim 21 wherein said rotatable member is a handwheel.

23. A valve as set forth in claim 20 wherein said ball-bearing drive means further comprises brake means frictionally engageable with said rotatable member upon movement of said plunger from its closed position toward its opened position thereby to prevent fluid pressure within said bore from acting against said plunger and self-opening the valve.

24. A valve as set forth in claim 1 wherein said valve body has one or more passages therethrough in which steam or other elevated temperature fluid may be circulated to heat the valve.

25. A valve for service in a fluid pressure system in which the system fluid is a heated liquid having a freezing point above room temperature and which upon freezing forms a substantially incompressible solid, said valve comprising a valve body having a bore therein, an inwardly projecting shoulder in said bore constituting a stationary valve seat, an inlet port in communication with said bore on one side of said bore valve seat and an outlet port in communication with said bore on the other side of said bore valve seat, said inlet port, said outlet port, and a portion of said bore including said bore valve seat constituting a flow passage through said valve body, said valve further comprising a cylindric plunger having a seat thereon, said plunger being axially movable within the said bore between a closed position in which its seat is matingly engaged with said bore seat in face-to-face sealing relationship therewith so as to block the flow of said system fluid through said flow passage and a retracted position in which said plunger is substantially clear of said flow passage thereby to permit said system fluid to flow through said flow passage substantially without restriction by said plunger, said plunger being of a substantially constant diameter only slightly less than the diameter of said bore thereby to eliminate all cavities or pockets in which said system fluid could accumulate and freeze when the plunger is in its closed position and thereby prevent the plunger from moving to its open position, one or more passages in said valve body through which steam or other heated fluid may be circulated to heat the valve to inhibit the freezing of said system fluid within the valve, and ball-bearing screw drive means carried by said valve body for moving said plunger between its opened and closed positions.

* * * * *